May 6, 1969     O. G. ESBECK     3,442,550
END GATE STRUCTURE
Filed June 6, 1967
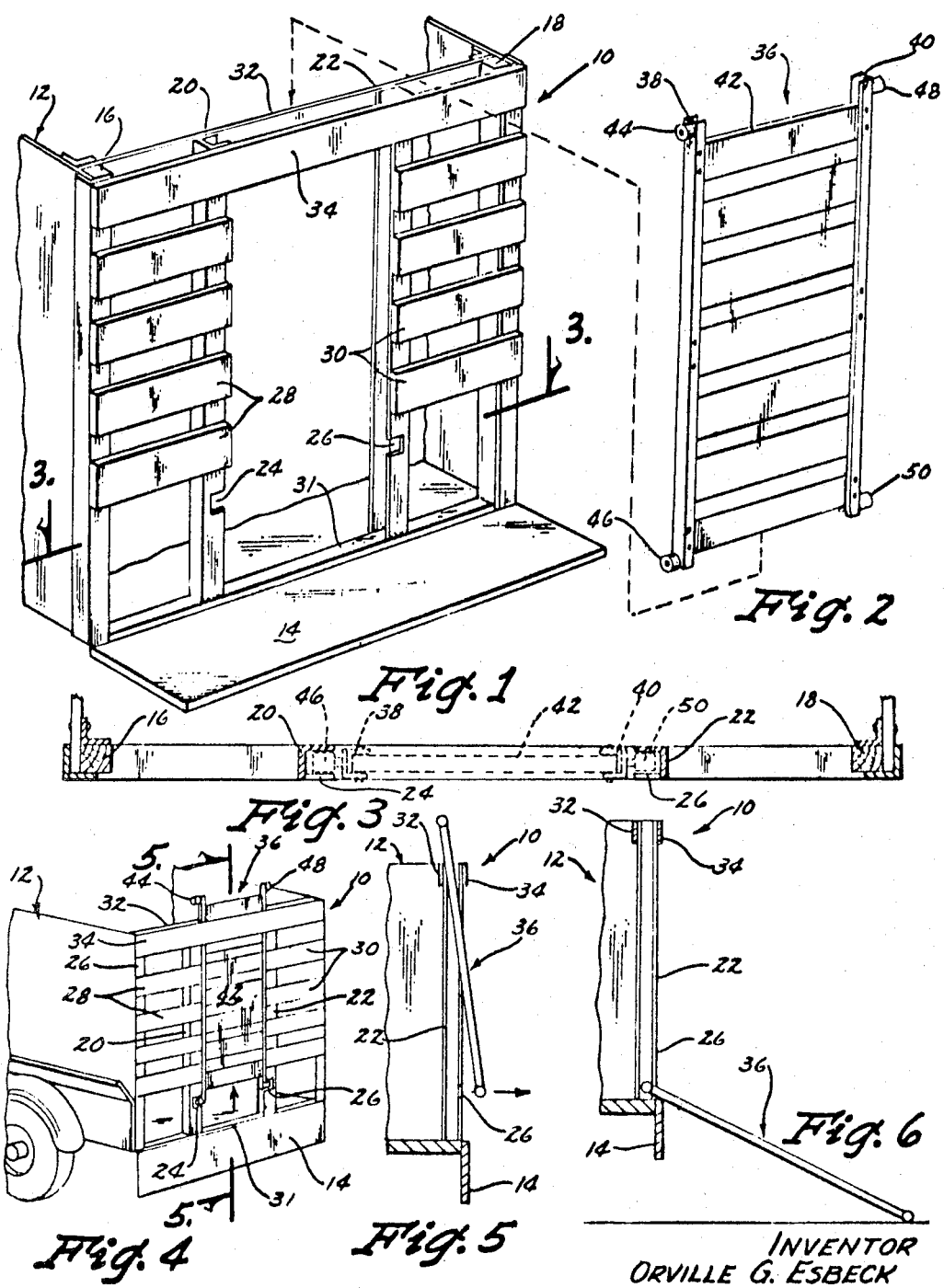
INVENTOR
ORVILLE G. ESBECK
BY
Beck, Zarley, McKee & Thomte
ATTORNEYS

United States Patent Office 3,442,550
Patented May 6, 1969

3,442,550
END GATE STRUCTURE
Orville G. Esbeck, Brayton, Iowa 50042
Filed June 6, 1967, Ser. No. 643,965
Int. Cl. B62d 25/00, 33/00; E06b 11/06
U.S. Cl. 296—50     3 Claims

ABSTRACT OF THE DISCLOSURE

An end gate structure for a truck or the like including a door movably mounted in a supporting frame means. The door may be moved with respect to the supporting frame so that the same may be converted into a ramp for loading animals into the truck upon which the end gate is mounted.

---

It is a principal object of this invention to provide an end gate structure for a truck or the like which may be used as an end gate or as a loading ramp.

A further object of this invention is to provide an end gate structure for trucks or the like with or without end gates.

A further object of this invention is to provide an end gate structure which may be used with extended racks.

A further object of this invention is to provide an end gate structure including a door movably mounted in a supporting frame means, the door having rollers provided thereon to facilitate the movement of the door from a vertical position to an inclined position so that the door may be used as a loading ramp.

A further object of this invention is to provide an end gate structure which is adapted for use with a variety of different vehicles.

A further object of this invention is to provide an end gate structure including a movable door, the end gate structure having means thereon to prevent the door from becoming inadvertently detached therefrom.

A further object of this invention is to provide an end gate structure which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a rear perspective view of the end gate structure with the door removed therefrom;

FIG. 2 is a rear perspective view of the door portion of the end gate structure;

FIG. 3 is an enlarged sectional view as would be seen on line 3—3 of FIG. 1;

FIG. 4 is a rear perspective view of the end gate structure mounted on a pickup truck;

FIG. 5 is an enlarged sectional view as would be seen on line 5—5 of FIG. 4 which illustrates the movement of the door with respect to the supporting frame; and FIG. 6 is a view similar to FIG. 5 except that the door has been moved to its loading ramp position.

The numeral 10 generally designates the end gate structure of this invention and it may be mounted on any suitable vehicle such as a pickup 12 seen in FIG. 4. The end gate structure obviously could also be mounted in a regular truck or a wagon. The end gate structure may be used regardless of whether or not the vehicle has a folding tail gate 14 but the end gate structure disclosed herein is ideally suited for use with a pickup truck such as is seen in FIG. 4.

The numerals 16 and 18 designate corner posts which are secured to the opposite sides of the vehicle box by any convenient means. A pair of side posts 20 and 22 are spaced inwardly from corner posts 16 and 18 and are channel-shaped in cross-section as best seen in FIG. 3. Side posts 20 and 22 are provided with notches 24 and 26 formed therein at a point upwardly from the lower ends thereof respectively. A plurality of board members 28 are secured to posts 16 and 20 and extend therebetween as seen in FIG. 1. A plurality of boards 30 are secured to posts 22 and 18 and extend therebetween as also seen in FIG. 1. A pair of support members 32 and 34 are secured to posts 16, 20, 22 and 18 at the upper portions thereof by any convenient means. As seen in FIG. 1, the space between posts 16 and 20 below the lowermost board 28 may be left open when the vehicle includes the folding tail gate since the tail gate will cover the opening when folded to its closed position. Likewise, the space between posts 22 and 18 below the lowermost board 30 may be also left open when the vehicle includes the folding tail gate 14. However, if the vehicle does not include the folding tail gate 14, it is obvious that it would be desirable to provide the boards 28 and 30 along the entire length of their respective posts. As seen in FIG. 1, a support member 31 is secured to and extends between the lower ends of posts 16, 20, 22 and 18.

The numeral 36 generally designates the door which is mounted in and between the posts 20 and 22 and includes a pair of spaced apart channel members 38 and 40 having a plurality of transverse members 42 secured thereto and extending therebetween. As seen in FIG. 3, the channel members on the door 36 can be each comprised of a pair of angles secured together. Members 42 may be comprised of wood or cleated aluminum to provide a durable surface upon which the animals will walk. A pair of rollers 44 and 46 are secured to the sides of channel member 38 at the upper and lower ends thereof by any convenient means and a pair of rollers 48 and 50 are secured to the side of channel member 40 at the upper and lower ends thereof respectively. Thus, when the door 36 is mounted within the end gate structure, rollers 44 and 46 will be received by post 20 and rollers 48 and 50 will be received by post 22.

When it is desired to convert the door 36 into a loading ramp, the door 36 is raised vertically until the rollers 46 and 50 are aligned with the notches 24 and 26 respectively. At this point, there is sufficient clearance at the top of the end gate structure to permit the lower end of the door to be pivoted outwardly or rearwardly as indicated in FIG. 5. Simultaneously with this action, the door 36 is moved downwardly with the upper rollers 44 and 48 being maintained within their respective chrannels on posts 20 and 22 and this sequence is illustrated in FIG. 6. When the rollers 44 and 48 have substantially reached the bottom of the posts 20 and 22, the door 36 assumes the position of a loading ramp as shown in FIG. 6. Livestock can then utilize the loading ramp and the door can be subsequently closed by reversing the procedure described above.

Thus, because the rollers 44, 46 and 48, 50 are mounted within the channels provided by posts 20 and 22 respectively, the door will not become inadvertently opened. The only way the door can be opened is to vertically move the same so that the rollers 46 and 50 can pass outwardly through notches 24 and 26 respectively. While the end gate structure has been described as being ideally suited for a livestock rack such as illustrated in FIG. 1, it can be appreciated that the same end gate structure will function quite efficiently in end gate structures wherein the height is somewhat less than as illustrated in the draw-

I claim:
1. In an end gate structure for a vehicle,
first and second spaced apart, vertically disposed support members,
a door means movably mounted between said support members and being pivotally movable with respect thereto,
said support members each being comprised of channel members, said door means having a pair of vertically spaced roller elements at each of its sides which are received by said channel members,
each of said channel members having an opening formed therein upwardly from their lower ends to permit the lower elements on said door means to pass outwardly through said openings so that said door means can be pivoted with respect to said channel members to convert said door means into a loading ramp.

2. The structure of claim 1 wherein the upper roller elements are secured to said door means at the upper end thereof, the lower roller elements being secured to said door means at the lower end thereof.

3. The structure of claim 1 wherein a brace means is secured to and extends between the upper ends of said support members.

References Cited

UNITED STATES PATENTS

| | | | |
|---|---|---|---|
| 502,510 | 8/1893 | Dorn | 214—85 X |
| 1,632,747 | 6/1927 | Nash et al. | 296—52 X |
| 2,801,130 | 7/1957 | Booker | 296—106 X |

FOREIGN PATENTS 455,873  10/1936  Great Britain.

BENJAMIN HERSH, *Primary Examiner.*

J. A. PEKAR, *Assistant Examiner.*

U.S. Cl. X.R.

49—37